Sept. 24, 1940.   G. T. RONK   2,215,886
COMBINATION RAILWAY AND HIGHWAY CAR
Filed Dec. 6, 1933   2 Sheets-Sheet 1
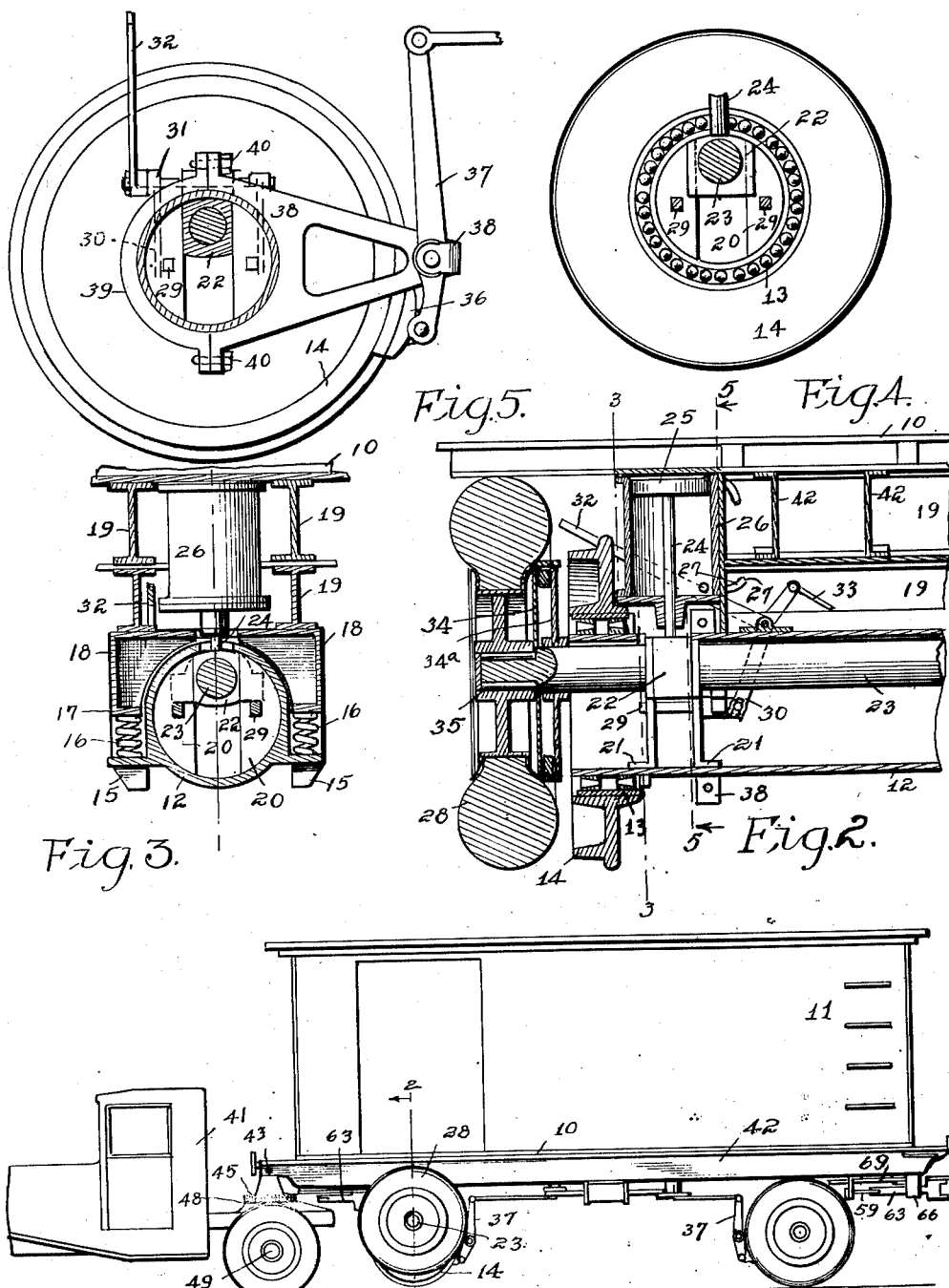
Inventor
George T. Ronk.

Sept. 24, 1940. G. T. RONK 2,215,886
COMBINATION RAILWAY AND HIGHWAY CAR
Filed Dec. 6, 1933 2 Sheets-Sheet 2

Inventor
George T. Ronk
by Orwig & Hague
Attys

Patented Sept. 24, 1940

2,215,886

UNITED STATES PATENT OFFICE 2,215,886

COMBINATION RAILWAY AND HIGHWAY CAR

George T. Ronk, Cedar Rapids, Iowa

Application December 6, 1933, Serial No. 701,141

33 Claims. (Cl. 105—215)

The object of my invention is to provide an improvement in car construction of the type adapted for either railway or highway operation, wherein the car may be easily and rapidly connected to either a railway train or to a tractor truck without the use of extra tools or equipment.

A further object of my invention is to provide in a car construction of the type above referred to improved coupling means whereby either end of the car may be easily and quickly connected to the rear end of a tractor truck, in such manner that the entire weight of the forward end of the car, together with the forward supporting wheels, may be carried by the rear end of said truck when used as a highway car.

A further object is to provide in a car construction of the type above described improved means whereby either end of the car may be easily and quickly connected to the rear end of a tractor truck in such a manner that the entire weight of the front end of the car may be carried by the rear end of the truck when used as a highway car, and in connection therewith an auxiliary coupling device, whereby the car may be coupled into the ordinary rail train, with both sets of railway wheels resting on the railway track, and whereby said auxiliary coupling device may be easily and quickly moved to an inoperative position when the car is coupled to a tractor truck.

A further object is to provide in a freight car, having one set of wheels for railway operation and another independent set of wheels for highway operation, improved means for transferring the weight of the car from one set of wheels to the other set of wheels.

A further object of my invention is to provide in a freight car of the type above described, having one set of wheels for railway operation and another set of wheels for highway operation, improved means for mounting the wheels whereby the axles of both sets of wheels may be supported and operated in a common vertical plane transversely to the line of movement of the cars.

A further object is to provide in a car of the type above described improved brake applying means as applied to the railway wheels of the car, wherein the braking strains will be carried by the axle housings rather than the car supporting frame.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved car showing the manner in which the same is connected to the rear end of a tractor truck.

Figure 2 is a detail sectional view taken on the line 2—2 of Figure 1.

Figure 3 is a detail sectional view taken on the line 3—3 of Figure 2.

Figure 4 is a detail sectional view taken on the line 3—3 of Figure 2, looking toward the outer end of the shaft.

Figure 5 is a detail sectional view taken on the line 5—5 of Figure 2.

Figure 11:
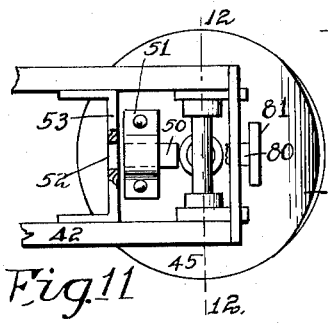
Figure 11 is a top view of same.
Figure 12:
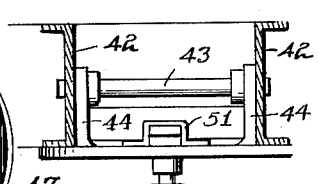
Figure 12 is a detail sectional view taken on the line 12—12 of Figure 11.

My improved car comprises a main frame 10 having a car body 11 carried thereby. Supported transversely beneath the frame 10 I have provided a tubular axle 12 of comparatively large diameter and adapted to carry a set of roller bearings 13 at each end. Each set of roller bearings 13 is provided with a car wheel 14 adapted to operate on railway tracks. The spacing of the tread of the wheels 14 is standard railway tread.

Near each end of the axle housing 12 is provided a set of spring supporting brackets 15. Said brackets extend laterally from the tubular housing near its bottom end in opposite directions. Each of the brackets 15 is designed to support a spring 16. Each of the springs supports a head 17 carried by the lower end of a pedestal 18.

The frame 10 is supported by the pedestals 18 by means of suitable I-beams 19. Thus means is provided whereby the weight of the car frame 10 may be supported by the railway wheels 14 through the members 19, the pedestals 18, the springs 16, the brackets 15 and the axle housing 12. Clearance is provided between the axle housing 12 and the pedestal 18 to permit a considerable amount of movement between the said pedestal and the housing 12.

Supported within the housing 12 near each of its ends I have provided two sets of vertical guides 20 substantially in the form of semicircular disks having their rectilinear edges parallel and spaced apart as clearly illustrated in Figure 3.

The said members 20 are secured in the housing by suitable flanges 21. Slidably mounted between the vertical guides 20 of each set I have provided an axle boxing 22 for carrying an axle 23. Each of the axle boxings is supported by a vertically arranged piston rod 24 supported by a piston 25 mounted in a suitable cylinder 26. The said cylinder is carried by the under surface of the frame 10.

A pipe 27 is provided for admitting fluid under pressure to the lower end of the piston 25. This provides means whereby the boxing 22 may be elevated and with it the shaft 23, causing the road wheels 28 carried by the ends of said shaft to also be elevated with their tread portions above the tread portions of the wheels 14, whereby the wheels 14 may be permitted to carry the weight of the car body.

The boxings 22 are locked in their elevated position by means of suitable slide bolts 29 mounted in the members 20, said slide bolts being actuated by means of suitable lever devices 30. The levers 30 are pivoted at 31 and include an outwardly extending lever portion 32 designed to form a handle, whereby the bolts 29 will be moved inwardly as the free ends of the levers 32 are moved downwardly and vice versa.

The upper end of the lever 30 is provided with a link 33 for operatively connecting a similar set of levers and slide bolts in the guide members in the opposite end of the tube 12.

When it is desired to convert the car to a road vehicle, the bolts 29 are withdrawn, permitting the wheels 28 to drop to the ground surface, after which air is admitted to the upper end of the cylinder 26, causing the car body to be elevated with respect to the axle 23, thus lifting the wheels 14 from their supporting rails and applying the load to the road wheels. The boxings 22 will then be below the bolts 29, which may then be moved into closed position, whereby the weight of the car body will be carried by the said bolts and boxings 22.

As will be seen from Figure 2, the wheels 28 are supported outside of the wheels 14, so that the axle 23 is free to move vertically in a plane common to the longitudinal central axis of the tube 12, thus providing means whereby the axles 12 may be placed the most efficient distance from the ends of the body 11 to give the best distribution of the weight on the axles.

By mounting the axle 23 to move in a vertical plane common to the vertical plane of the axle 12, it will be seen that the load distribution is the same for both sets of axles.

Each of the wheels 28 is provided with a brake drum 34, which is of a construction similar to that used on automobile wheels. The brake mechanism 34a is fixed to the axle 23, which is permanently fixed in the boxings 22, so that the torsional strain transmitted to the member 34a will be carried by said axle 23 and the boxings 22 and the guides 20.

The wheels 28 are rotatively mounted on the ends of the axles 23 by suitable roller bearings 35. Brake shoes 36 are provided for the wheels 14, each of which is carried by the lower end of a lever 37, which in turn is pivotally supported in a bracket 38 secured to the tubular housing 12 by means of a clamp 39 and bolts 40. The bracket 38 is rigidly fixed to the housing 12, so that the braking forces will be transmitted to said housing torsionally. The housing is supported against any great torsional movement by the springs 16 and the pedestal 18.

By this arrangement the braking strain of both the axles 12 and 23 is carried by the housing 12 and transmitted to the frame through the springs 16. This provides means for reducing the chattering vibration as applied to the car body, overcoming a large amount of noise and undesirable vibration.

The fluid for operating the piston 25 may be supplied by any suitable means. This mechanism is not illustrated or described as it forms no part of my present invention.

By this arrangement it will be seen that I have provided means whereby the weight of the car body may be easily and quickly transferred from one set of wheels to the other, whereby the car may be either utilized for railway service or highway service at the will of the operator, without the necessity of unloading or changing the load in the car body after it is once placed in position.

For coupling the car to the rear end of a tractor truck 41, I have provided the following mechanism:

The frame 10 is provided with a pair of parallel longitudinally extending beams 42, said beams extending throughout the entire length of the frame 10 and projecting slightly beyond the ends of the body 11, so that when the car is hitched in a train, the pulling strain is transmitted through said beams 42, thus relieving the car frame of said strains. Each end of the beams 42 is provided with a bolt 43 supported in the upper ends of upwardly extending bracket members 44 carried by a horizontally arranged circular plate 45, which serves as a fifth wheel for the rear end of the truck 41.

Figure 10:
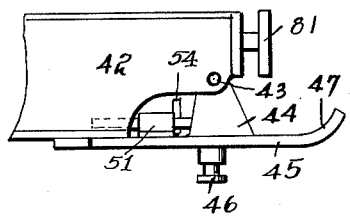
Figure 10 is a side elevation of a segmental portion of one end of the car frame showing the means for coupling the car frame to the rear end of a tractor truck.

The central portion of the plate 45 has a downwardly extending pivot member 46, which may be connected to the truck in the usual manner. The forward edge of the plate 45 is curved upwardly at 47, as indicated in Figures 10 and 11. This upwardly curved portion provides means wherein the plate 45 may be more easily connected to the lower member 48 of the fifth wheel. The pivot member 43 provides means whereby perfect pivotal action takes place between the front end of the car and the rear end of the automobile truck 41.

The fifth wheel 45 is placed vertically above the rear axle 49 of said truck, so that the entire weight of the forward end of the body 11 may be carried by the rear end of the truck with both sets of the front wheels supported above the ground surface.

When it is desired to remove the fifth wheel 45, the pin 43 may be withdrawn permitting the said members to be separated.

Sometimes it is desirable to lock the member 45 against pivotal movement about the member 43, which is accomplished by means of a slide bolt 50, slidably mounted in a suitable bracket 51, carried by the upper surface of said plate 45. Said bolt is adapted to be moved into a suitable opening 52 in a cross bar 53, supported between the beams 42. Said bolt 50 is actuated by means of a handle device 54.

Thus means is provided whereby either end of the car may be connected to the rear end of a tractor truck, inasmuch as both ends of the beams 42 are alike. The forward end of the car may be elevated by first lowering the wheels 28, thereby elevating the forward end of the beams 42, after which the rear end of the truck 41 may be moved into position. The wheels 28 are then elevated, causing the entire weight of the forward end of the car and one set of wheels to be carried by the rear end of the truck. This provides means whereby the car may be operated as a two wheel trailer when used on highways, and wherein transverse oscillations of the forward end of the car relative to the truck may be eliminated.

For coupling the car into a train, I have provided on the lower edges of the members 42, near their ends, downwardly extending brackets 55 having upwardly extending end portions 56, which are secured to the members 42 by suitable bolts 57.

Mounted transversely above the members 55 is a pair of plates 58 designed to rest normally against the inner faces of the members 56. The centers of the plates 58 are designed to slidably support a draw bar 59 having a nut 60 on its inner end and a shoulder 61 near its central portion. The nut 60 is designed to engage the outer surface of the inner member 56 when the bar 59 is pulled forwardly while the shoulder 61 is designed to engage the member 58 as the bar 59 is moved rearwardly.

A spring 62 is mounted on the bar 59 between the plates 58 so that as the bar 59 is pulled forwardly, the inner plate 58 will be engaged by the nut 60, causing a yieldable pressure to be applied to the outer plate 58, which in turn will be applied to the outer members 56, to advance the beams 42. In a like manner rearward movement of the bar 59 will cause the shoulders 61 to engage the outer plate 58 and yieldable pressure will be applied to the inner plate 58, thus providing means for yieldably connecting the beams 42 with the car coupler bar 63, which is provided at its forward end with a coupler device 64 of standard construction, such as used on railway cars now in common use.

The rear end of the member 63, however, is pivotally connected to the bar 59 by means of a bolt 65. The forward end of the bar 63 is slidably mounted in a block 66 having a laterally extending portion 67 at its upper end, said portion 67 having a slot 68 for receiving the curved bar 69, said bar being fixed to the beams 42 by means of rivets 70 and 71.

Figure 7:
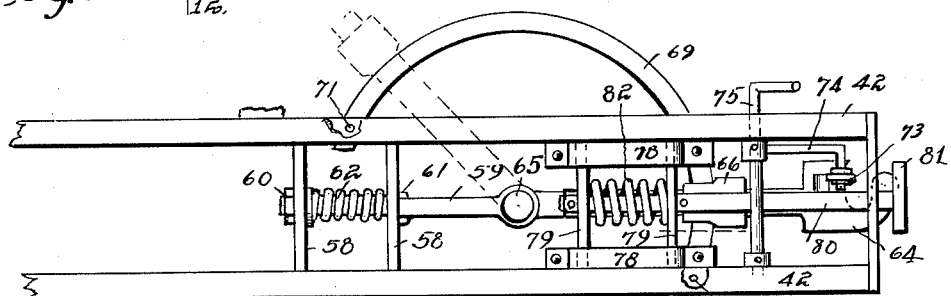
Figure 7 is a top view of a portion of the car frame showing the manner in which the car coupler is connected thereto and the track for supporting the coupler in its inoperative position.
Figure 9:
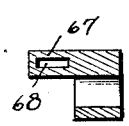
Figure 9 is a detail sectional view of the coupler supporting block.
Figure 8:
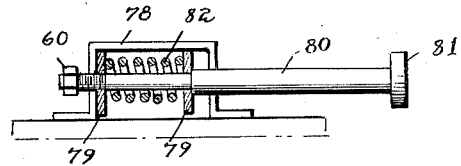
Figure 8 is a detail sectional view of the bumper mechanism.
Figure 6:
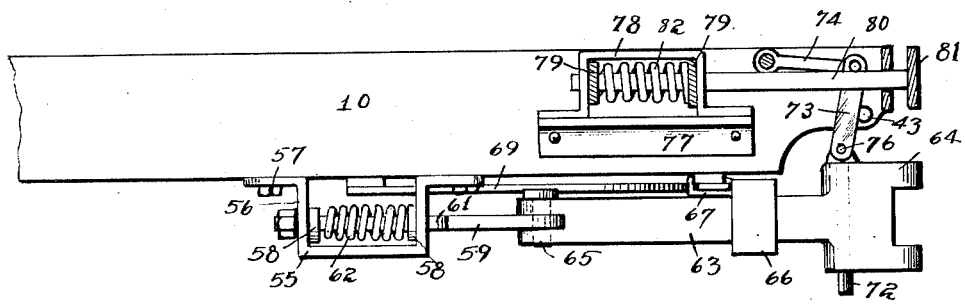
Figure 6 is a detail sectional view showing the car coupler and the means for supporting same in an inoperative position.

By this arrangement the forward end of the bar 63 is free to swing laterally in one direction about the pivot 65 to the dotted line position shown in Figure 7, where it is out of the way at any time when it is desired to connect the forward end of the car to the rear end of a tractor truck.

A coupling pin 72 of the coupler 64 may be elevated and lowered by means of a link 73 carried by a rock arm 74 supported by the rock shaft 75 in substantially the same manner as that provided in the ordinary car construction.

The pin 72 is detachably connected to the link 73 by means of a pin 76, when it is desired to swing the coupler 64 to the dotted line position in Figure 7.

Supported by the inner faces of the beams 42 I have provided brackets 77 designed to carry inverted U-shaped bracket members 78 having cross bars 79 similar to the bars 58. The central portion of the bar 79 slidably supports a bumper rod 80 having a bumper plate 81 at its forward end. That portion of the bar 80 between the plates 79 is provided with a spring 82, for yieldably supporting the plates 79 against and parallel to the members of the bracket 78. The operation of this bumper is similar to the yieldable bar 59.

Thus it will be seen that I have provided a combined highway and railway car which is particularly adapted to be used for either purpose, and which may be easily converted to either by connecting it in a train of cars or to the rear end of a tractor truck, and when connected to the tractor trck, will operate as a two wheel trailer, and when connected in the railway train, will operate as a railway car.

In actual practice these cars will be considerably shorter than the ordinary freight car, so that the weight of the car and its load may be easily taken care of by the heavier type of trucks, such as now in common use on highways.

I claim as my invention:

1. A combined railway and highway car comprising a supporting frame, a pair of railway axle supporting pedestals, said pedestals having a pair of interacting horizontal axles mounted to move in a common vertical plane therein, means for yieldably supporting one of said axles to move vertically, railway car wheels carried by said axle, a set of highway wheels carried by the second axle, mechanically operated means for elevating and lowering the second axle relative to the first axle, whereby either set of wheels may be moved to operative position.

2. In a device of the class described, the combination of a supporting frame, axle supporting pedestals projecting downwardly therefrom having spring brackets, a hollow axle housing of comparatively large diameter slidably mounted to move vertically in said pedestals, said housing having laterally extending spring supports below said brackets, springs between said spring supports and said brackets, a wheel for supporting each end of said housing, an axle mounted longitudinally through said hollow axle housing, means for guiding said axle to move vertically in said housing, a wheel carried by each end of said axle, and means for elevating and lowering said axle relative to said housing.

3. In a device of the class described, the combination of a supporting frame, a car body carried thereon, a set of road wheels near each end of said frame for supporting the same to operate on a highway, a set of railway wheels near each end of said frame to operate on railway rails, means for transferring the weight of said frame to either set of said wheels, and means detachably and pivotally connecting either end of said frame to one end of a self-propelled tractor truck and for carrying the weight of the attached end of said trailer and the supporting wheels carried thereby.

4. In a device of the class described, the combination of a supporting frame, a car body carried thereon, a set of road wheels at each end of said frame for supporting the same to operate on highways, a set of railway wheels, means for operatively connecting both sets of wheels with said car body whereby one set of wheels may be elevated and lowered relative to the other set of wheels and in a common vertical axial plane, means for transferring the weight of said body to either set of said wheels, means detachably and pivotally connecting either end of said frame to one end of a self-propelled tractor truck and for carrying the weight of the attached end of said car body and the supporting wheels carried thereby.

5. In a device of the class described, the combination of a supporting frame, a car body carried thereon, a set of road wheels for supporting the same to operate on highways, a set of railway wheels, means for operatively connecting both sets of wheels with said car body whereby one set of wheels may be elevated and lowered relative to the other set of wheels and in a common vertical axial plane, means for transferring the weight of said body to either set of said wheels.

6. In a device of the class described, the combination of a supporting frame, axle supporting pedestals projecting downwardly therefrom, a tubular axle housing of comparatively large diameter slidably mounted to move vertically in said pedestals, yieldable means operatively connecting said pedestals and said tubular housing, a wheel rotatively mounted on each end of said tubular housing, an axle extending longitudinally through said housing, means for guiding said axle to move vertically in said housing, a wheel rotatively mounted on each end of said axle, means for elevating and lowering said axle relative to said housing, and means for locking said axle in either its elevated or lowered position.

7. In a device of the class described, the combination of a supporting frame, axle supporting pedestals projecting downwardly therefrom, a tubular axle housing of comparatively large diameter slidably mounted to move vertically in said pedestals, yieldable means for connecting said pedestals to the said housing, an axle extending longitudinally through said housing, means for guiding said axle to move vertically therein in a common plane with the center of said tubular housing and to support the axle against rotary movement, means for elevating and lowering said axle relative to said housing, wheels supporting the ends of said tubular housing, wheels rotatively mounted on the ends of said axles, brake drums carried by the last said wheels, and brake mechanism fixed to said axle.

8. In a device of the class described, the combination of a supporting frame, axle supporting pedestals projecting downwardly therefrom, a tubular axle housing of comparatively large diameter slidably mounted to move vertically in said pedestals, yieldable means for connecting said pedestals to the said housing, an axle extending longitudinally through said housing, means for guiding said axle to move vertically therein in a common plane with the center of said tubular housing and to support the axle against rotary movement, means for elevating and lowering said axle relative to said housing, wheels supporting the ends of said tubular housing, wheels rotatively mounted on the ends of said axles, brake drums carried by the last said wheels, brake mechanism fixed to said axle, and brake mechanism fixed to said tubular housing for the first said wheels.

9. In a device of the class described, the combination of a supporting frame, axle supporting pedestals projecting downwardly therefrom, a tubular axle housing of compartively large diameter mounted to move vertically in said pedestals, yieldable means operatively connecting said pedestals and said tubular housing, a wheel mounted on each end of said tubular housing, an axle extending longitudinally through said tubular housing and mounted to move vertically therein, a wheel supported on each end of said axle, and means for elevating and lowering said axle relative to said housing.

10. A combined railway and highway car comprising a supporting frame, a pair of railway axle supporting pedestals, said pedestals having a pair of interacting horizontal axles mounted to move in a common vertical plane, means for yieldably mounting one of said axles to move vertically, railway car wheels carried by said axle, a set of highway wheels carried by the second axle, mechanically operated means carried by the frame for elevating and lowering the second axle relative to the first axle whereby either set of wheels may be moved to operative position, and means carried by the first axle for locking the second axle in either an elevated or lowered position.

11. In a device of the class described, the combination of a supporting frame, axle supporting pedestals projecting downwardly therefrom, a tubular axle housing of comparatively large diameter mounted to move vertically in said pedestals, yieldable means operatively connecting said pedestals and said tubular housing, a wheel mounted on each end of said tubular housing, an axle extending longitudinally through said housing, means for guiding said axle to move vertically in said housing, and means for elevating and lowering said axle relative to said housing.

12. In a device of the class described, the combination of a supporting frame, axle supporting pedestals projecting downwardly therefrom having spring brackets, a hollow axle housing of comparatively large diameter mounted to move vertically in said pedestals, said housing having laterally extending supports below said brackets, springs between said spring support and said brackets, a wheel for supporting each end of said housing, an axle mounted longitudinally through said hollow axle housing, means for guiding said axle to move vertically in said housing, a wheel carried by each end of said axle, and means for elevating and lowering said axle relative to said housing.

13. In a device of the class described, the combination of a supporting frame, axle supporting pedestals projecting downwardly therefrom having spring brackets, a hollow axle housing of comparatively large diameter mounted to move vertically in said pedestals, said housing having laterally extending supports below said brackets, springs between said spring support and said brackets, a wheel for supporting each end of said housing, an axle mounted longitudinally through said hollow axle housing, means for guiding said axle to move vertically in said housing, a wheel carried by each end of said axle, means for elevating and lowering said axle relative to said housing, and means for locking the axle to said housing either in its elevated or its lowered position of movement.

14. The combination of a car body, a set of highway wheels connected to and near one end of said car body for highway use, a set of railway wheels connected to and near the other end of said car body for railway use, and means attached to each end of said car body for supporting the weight of the corresponding end of said car body and the adjacent set of wheels, and for pivotally connecting the corresponding ends of said car to a suitable pivot and weight supporting member carried by the back end of a mobile support.

15. The combination of a car body having a set of railway wheels for railway use near one end of said body, a set of highway wheels near the other end of said body for highway use, carrier means provided at each end of said car body, either of which is adapted to be carried by the supporting means of a mobile support for carrying the weight of the adjacent end of said car body and its adjacent set of wheels, and means for pivotally connecting the adjacent end of the car body to a mobile support.

16. The combination of a car body, axle supporting pedestals mounted to and near each end of said car body, an axle operatively mounted in each set of pedestals, wheels for highway use carried by one of said axles, wheels for railway use carried by the other axle, means attached to each end of said car body, either of which is adapted to be carried by the supporting means of a mobile support for carrying the weight of the adjacent end of said car body and the adjacent set of car wheels, and means for pivotally connecting one end of a mobile support to the adjacent end of said car frame; power operated means carried by said frame and operatively connected to one of said axles for elevating said car frame relative to the axle with which the said means is connected and the wheel supporting surface whereby the end of said car body may be elevated for coupling purposes.

17. The combination of a car body, axle supporting pedestals mounted to and near each end of said car body, an axle operatively mounted in each set of pedestals, wheels for highway use carried by one of said axles, wheels for railway use carried by the other axle, means attached to each end of said car body, either of which is adapted to be carried by the supporting means of a mobile support for carrying the weight of the adjacent end of said car body and the adjacent set of car wheels, and means for connecting one end of a mobile support to the adjacent end of said car frame, power operated means carried by said frame and operatively connected to one of said axles for elevating said car frame relative to the axle with which the power operated means is connected whereby the car body will be elevated for coupling purposes, and means for elevating the axle and wheels relative to the car frame after the said car frame has been elevated.

18. In a device of the class described, the combination of a car body, a draft beam supported longitudinally of the central portion of the under surface of said car body, convertible wheel axles carried by said car body near each of its ends, railway and roadway wheels carried by each set of said axles for carrying their proportionate weight of said car body, means supported by one axle of each set of axles for hoisting the corresponding ends of said beam for mounting the elevated end of said beam on one end of a mobile vehicle, means for detachably and pivotally connecting the beam to said mobile vehicle whereby the proportionate weight of the pivoted end of said car may be carried by the corresponding end of said beam while the proportionate weight of the opposite end of said car may be carried by one set of said wheels.

19. In a device of the class described, a hollow axle housing, a wheel rotatably mounted on each end of said housing, vertically arranged guides in each end of said housing, a bearing box slidably mounted in each set of vertical guides, an axle carried in said boxes and adapted to be elevated and lowered in said housing, means for elevating said axle relative to said housing, and a slide bolt supported by each set of guides for locking said axle in either of its upper or lower positions of movement.

20. In a device of the class described, a hollow axle housing, a wheel rotatably mounted on each end of said housing, vertically arranged guides in each end of said housing, a bearing box slidably mounted in each set of vertical guides, an axle carried in said boxes and adapted to be elevated and lowered in said housing, means for elevating said axle relative to said housing, a slide bolt supported by each set of guides for locking said axle in either of its upper or lower positions of movement, and means for simultaneously operating said slide bolts.

21. In a device of the class described, the combination of a supporting frame, axle supporting pedestals projecting downwardly from said frame, a hollow axle housing slidably and non-rotatably mounted to move vertically in said pedestals, yieldable means for connecting said axle housing to said pedestals, an axle extending longitudinally through said housing, means for slidably and non-rotatably mounting said axle to move vertically in said axle housing, highway wheels rotatably mounted on the ends of said axle, railway wheels rotatably mounted on said axle housing, brake mechanism carried by said axle housing for said railway wheels, and brake mechanism carried by said axle for said highway wheels.

22. In a device of the class described, the combination of a supporting frame, a car body carried thereon, wheels for carrying said supporting frame, a coupler device comprising a draw bar, means for mounting said draw bar to move longitudinally of said frame, means for yieldably mounting said draw bar therein, a coupler device pivotally connected to the outer end of said draw bar to permit the outer end of said coupler to swing in a horizontal plane, an arcuate track, a guide block slidably mounted on said track for supporting the coupler to slide longitudinally in said block, and means for attaching a coupler element of a tractor truck when the first coupler is swung into operative position.

23. In a device of the class described, the combination of a supporting frame, a draw bar, means for slidably mounting the draw bar to move longitudinally of said frame and of itself, a railway coupler element having one end pivotally connected to the outer end of said draw bar, means for attaching a second coupler element adapted to be used for coupling the frame to a tractor truck, and means for supporting the outer end of said railway coupler element to swing in a horizontal plane from an operative position in alinement with said draw bar to a rearwardly inclined position to permit the coupler element of a tractor truck to be operatively connected when used on said frame.

24. In a device of the class described, the combination of a supporting frame, a railway coupler element, means pivotally connecting said railway coupler to said supporting frame, means for attaching a second coupler element adapted to be used for coupling the frame to a tractor truck, and means for supporting the outer end of said railway coupler element to swing in a horizontal plane from operative position longitudinally of said frame to a rearwardly inclined position to permit the coupler element of a tractor truck to be operatively connected when used on said frame.

25. A combined railway and highway car comprising a supporting frame; a pair of interacting axles; means mounting said axles to move in a common vertical plane; means for yieldably supporting one of said axles to move vertically, railway car wheels carried by said axle, a set of highway wheels carried by the second axle, mechanically operated means for elevating and lowering the second axle relative to the first axle, whereby either set of wheels may be moved to operative position.

26. The combination of a body having a set of wheels near one end of said body, a set of wheels near the other end of said body, at least one set of said wheels consisting of a pair of wheels being adapted for highway use and a second pair adapted for railway use; carrier means provided at each end of said car body either of which is adapted to be carried by the supporting means of a mobile support for carrying the weight of the adjacent end of said car body and its adjacent set of wheels; means for pivotally connecting the adjacent end of the car body to the mobile support; and means operatively attached to said car body for moving said set of highway wheels vertically relative to said car body to raise said car body for mounting said mobile support.

27. The combination of a body having a set of wheels near one end of said body, a set of wheels near the other end of said body, said wheels being adapted for either highway or railway use; carrier means provided at each end of said car body either of which is adapted to be carried by the supporting means of a mobile support for carrying the weight of the adjacent end of said car body and its adjacent set of wheels; means for pivotally connecting the adjacent end of the car body to the mobile support; means operatively attached to said car body for moving either set of wheels vertically relative to said car body to raise said car body for mounting said mobile support; and means for retracting the wheels adjacent said mobile support toward said car body after said mounting.

28. The combination of a car body having a set of railway wheels for railway use near one end of said body, a set of highway wheels near the other end of said body for highway use, carrier means provided at each end of said car body, either of which is adapted to be carried by the supporting means of a mobile support for carrying the weight of the adjacent end of said car body and its adjacent set of wheels; means for pivotally connecting the adjacent end of the car body to a mobile support; and means for moving one set of said wheels vertically relative to said body whereby the carrier end of said body may be first elevated to operative position and thence the wheels elevated relative to said body to carrying position.

29. A rail trailer comprising a pair of rear rail wheels, whose centers are immovable longitudinally of the trailer, a pair of front rail wheels, and an upper fifth wheel mounted in advance of said front wheels, said trailer being adapted to become a highway semi-trailer by the use of suitable highway wheels instead of said rear wheels, said upper fifth wheel being adapted to engage a highway tractor and acting as a practical and complete support for the end of the trailer when said end is held in lifted position by the highway tractor with said front wheels entirely free of the highway.

30. A rail trailer comprising a chassis having a rigid forward extension immovable with relation to said chassis; a pair of front rail wheels; a pair of rear rail wheels whose centers are immovable longitudinally of the trailer, all of said front and rear wheels being of substantially the same size and being capable of sustaining loads at high speed on railroads; and an upper fifth wheel mounted on said extension, said trailer being adapted to become a highway semi-trailer by the use of suitable highway wheels instead of said rear wheels, said upper fifth wheel being adapted to engage a highway tractor and acting as a practical and complete support for the end of the trailer when said end is held in lifted position by the highway tractor with said front wheels entirely free of the highway.

31. A rail trailer comprising a chassis having a rigid forward extension immovable with relation to said chassis; a pair of rear rail wheels; a pair of front rail wheels; and an upper fifth wheel mounted on said extension, said trailer being adapted to become a highway semi-trailer by the use of suitable highway wheels instead of said rear wheels, said upper fifth wheel being adapted to engage a highway tractor and acting as a practical and complete support for the end of the trailer when said end is held in lifted position by the highway tractor with said front wheels entirely free of the highway.

32. A rail trailer comprising a chassis having a rigid forward extension immovable with relation to said chassis; a pair of rear rail wheels whose centers are immovable about a horizontal axis; a pair of front rail wheels, all of said front and rear wheels being of substantially the same size and being capable of sustaining loads at high speed on railroads; and an upper fifth wheel mounted on said extension, said trailer being adapted to become a highway semi-trailer by the use of suitable highway wheels instead of said rear wheels, said upper fifth wheel being adapted to engage a highway tractor and acting as a practical and complete support for the end of the trailer when said end is held in lifted position by the highway tractor with said front wheels entirely free of the highway.

33. A rail trailer comprising a pair of front rail wheels, a pair of rear rail wheels, all of said front and rear wheels being of substantially the same size and being capable of sustaining loads at high speed on railroads, and an upper fifth wheel in advance of said front wheels, said trailer being adapted to become a highway semi-trailer by the use of suitable highway wheels instead of said rear wheels, said upper fifth wheel being adapted to engage a highway tractor and acting as a practical and complete support for the end of the trailer when said end is held in lifted position by the highway tractor with said front wheels entirely free of the highway.

GEORGE T. RONK.